(12) United States Patent
Richton

(10) Patent No.: US 6,199,010 B1
(45) Date of Patent: Mar. 6, 2001

(54) WIRELESS TELECOMMUNICATIONS SYSTEM THAT PROVIDES NAVIGATIONAL ASSISTANCE TO TRAVELERS

(75) Inventor: Robert Ellis Richton, Madison, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/072,277

(22) Filed: May 4, 1998

(51) Int. Cl.$^7$ .............................. G01G 21/00; G00F 7/00; G00F 13/00; G00F 17/00; G00F 19/00
(52) U.S. Cl. ........................ 701/206; 701/206; 701/207; 701/214; 701/223; 701/300; 342/357.01; 342/357.08; 455/11.1; 455/13.1; 455/39; 340/825.44; 370/310; 370/312; 370/313
(58) Field of Search ..................................... 701/206, 207, 701/214, 300, 223; 342/357.01, 357.08; 455/11.1, 13.1, 39; 340/825.44; 370/310, 312, 313

(56) References Cited

U.S. PATENT DOCUMENTS

| | | | |
|---|---|---|---|
| 5,785,281 | * | 7/1999 | Peter et al. ............................ 244/190 |
| 5,884,213 | * | 3/1999 | Carlson ................................ 701/206 |
| 5,948,040 | * | 9/1999 | Delorme et al. ...................... 701/201 |

* cited by examiner

Primary Examiner—William A. Cuchlinski, Jr.
Assistant Examiner—Ronnie Mancho
(74) Attorney, Agent, or Firm—DeMont & Breyer, LLC; Jason Paul DeMont; Wayne S. Breyer

(57) ABSTRACT

A wireless telecommunications system is disclosed that provides both telecommunications service and navigational assistance to travelers. In particular, the present invention addresses three common navigation problems. First, to aid a traveler who takes the same trip infrequently, the present invention records the movement of the traveler during one trip and, thereafter, provides navigational assistance on how to recreate the trip again at a later time. Second, to aid a traveler in making the homeward portion of a trip, the present invention records the outward-bound portion of the trip and, thereafter, provides navigational assistance on how to get home. And third, to aid a traveler who is trying to recreate the trip of another traveler, the present invention records the movement of one traveler when taking a trip and, thereafter, provides navigational assistance to other travelers on how to recreate the trip taken by the first. In general, the present invention performs two distinct steps. In accordance with the first step, the present invention records the movement of a wireless terminal associated with a traveler as the traveler makes a trip. In accordance with the second step, the present invention generates a set of navigational directions based on a previously recorded trip, which directions indicate either how to recreate the trip or how to backtrack the trip. Those directions are then transmitted to a wireless terminal that is associated with a traveler who desires the directions.

26 Claims, 5 Drawing Sheets

100

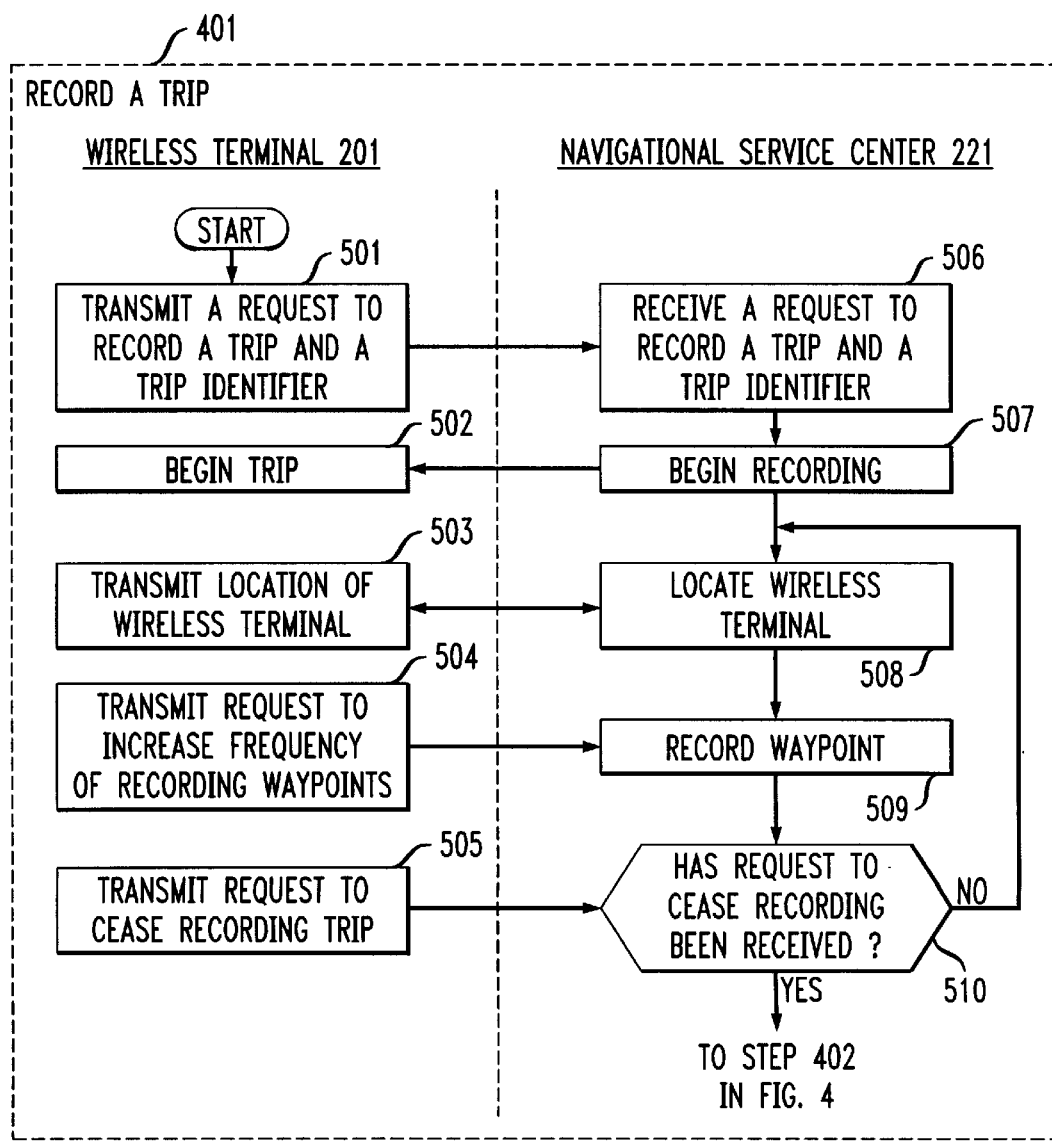

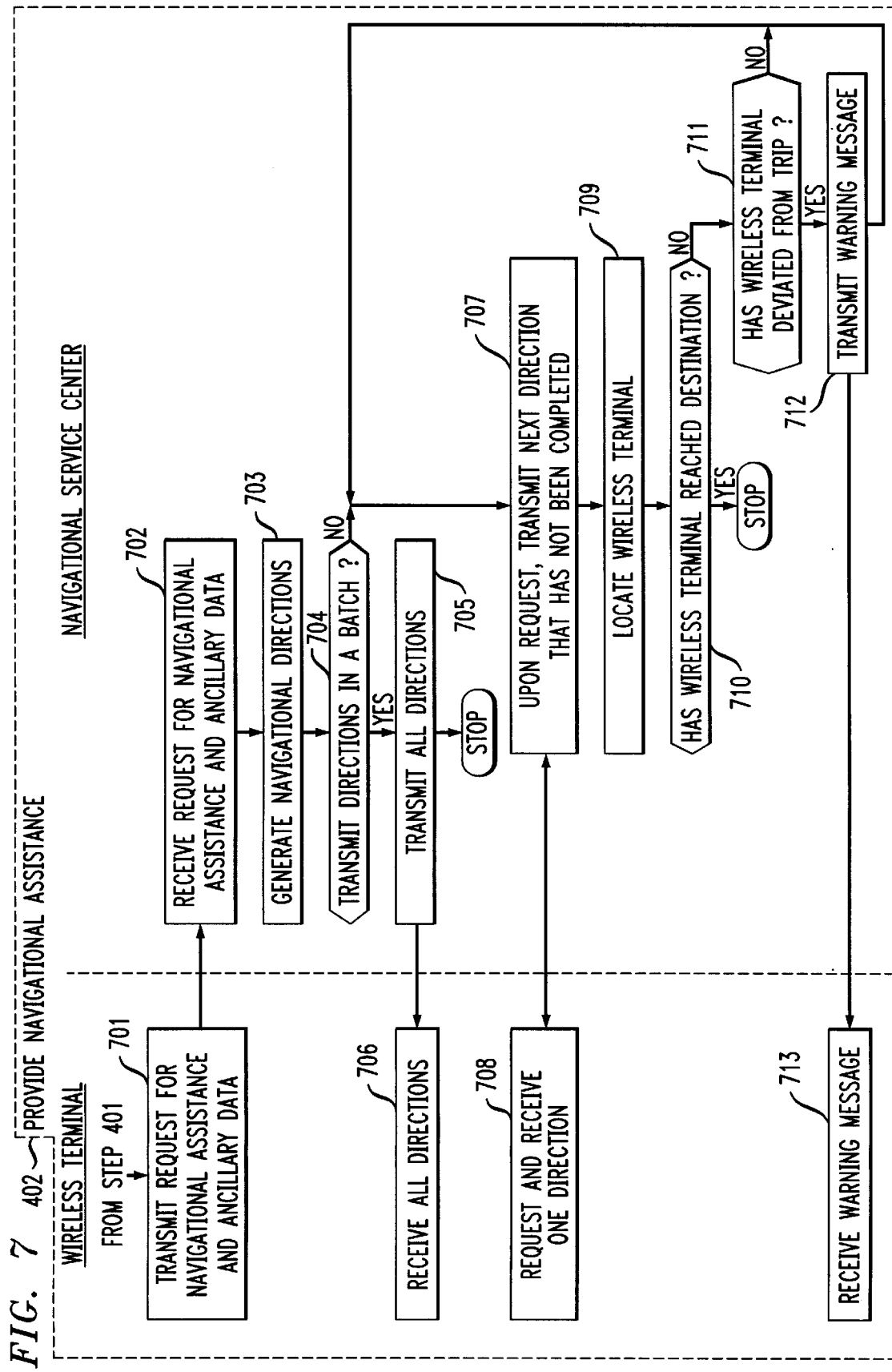

WIRELESS TELECOMMUNICATIONS SYSTEM THAT PROVIDES NAVIGATIONAL ASSISTANCE TO TRAVELERS

FIELD OF THE INVENTION

The present invention relates to telecommunications in general, and, more particularly, to a wireless telecommunications system that provides both telecommunications service and navigational assistance to travelers.

BACKGROUND OF THE INVENTION

FIG. 1 depicts a schematic diagram of a portion of a wireless telecommunications system in the prior art, which system provides wireless telecommunications service to a number of wireless terminals (e.g., wireless terminals 101-1 through 101-3) that are situated within a geographic region. The heart of a typical wireless telecommunications system is a wireless switching center ("WSC"), which also may be known as a mobile switching center or mobile telephone switching office. Typically, a wireless switching center (e.g., WSC 120) is connected to a plurality of base stations (e.g., base stations 103-1 through 103-5) that are dispersed throughout the geographic region serviced by the system and to the local and long-distance telephone and data networks (e.g., local-office 130, local-office 138 and toll-office 140). A wireless switching center is responsible for, among other things, establishing and maintaining a call between a first wireless terminal and a second wireless terminal or, alternatively, between a wireless terminal and a wireline terminal (e.g., wireline terminal 150), which is connected to the system via the local and/or long-distance networks.

The geographic region serviced by a wireless telecommunications system is partitioned into a number of spatially distinct areas called "cells." As depicted in FIG. 1, each cell is schematically represented by a hexagon. In practice, however, each cell has an irregular shape that depends on the topography of the terrain surrounding the cell. Typically, each cell contains a base station, which comprises: (1) the radios and antennas that the base station uses to communicate with wireless terminals in that cell; and (2) the transmission equipment that the base station uses to communicate with the wireless switching center.

For example, when a user of wireless terminal 101-1 desires to transmit information to a user of wireless terminal 101-2, wireless terminal 101-1 transmits a data message bearing the user's information to base station 103-1. The data message is then relayed by base station 103-1 to wireless switching center 120 via wireline 102-1. Because wireless terminal 101-2 is in the cell serviced by base station 103-1, wireless switching center 120 returns the data message back to base station 103-1, which relays it to wireless terminal 101-2.

Because people can require emergency assistance (e.g., first aid, police, fire, etc.) when they travel, a wireless telecommunications system must be capable of processing an emergency call (e.g., a "911" call in the United States, a "999" call in Europe, etc.) that is initiated from a wireless terminal. In particular, a wireless telecommunications system must perform three main steps when processing an emergency call from a wireless terminal:

1. the system must ascertain the precise location of the wireless terminal (e.g., its latitude and longitude to within 100 feet);
2. the system must route the emergency call to whichever emergency facility (e.g., police station, hospital, etc.) is closest to the location of the wireless terminal; and
3. the system must provide the authorities at the emergency facility with the location of the wireless terminal.

This last step is necessary because a person who places an emergency call from a wireless telephone might not know his or her precise location or might be injured or otherwise incapable of providing his or her location even if he or she knew it.

There are several techniques in the prior art for enabling a wireless telecommunications system to ascertain the precise location of a wireless terminal, and each requires the addition of specialized location equipment to the telecommunications system. Sometimes the location equipment is added to the base stations or other parts of the network, sometimes it is added to the wireless terminals, and sometimes it is added to both. In any case, the equipment for locating a wireless terminal is typically expensive.

Furthermore, although it is very important that a wireless telecommunications system be capable of processing an emergency call, the number of emergency calls actually placed is very small in comparison to the number of non-emergency calls. This has two significant implications. First, because the cost of the location equipment is expensive, the cost of the location equipment per emergency call is very high and, therefore, difficult to justify. Second, because emergency calls are infrequent, the location equipment is seldom used, which is an apparent waste of its unique capability.

Therefore, the need exists for a secondary use of the location equipment in a wireless telecommunications system, which secondary use does not interfere with its primary use in processing emergency calls and which helps to defray the cost of the location equipment.

SUMMARY OF THE INVENTION

The present invention is a wireless telecommunications system that uses its location equipment to provide navigational assistance to travelers when the location equipment is not processing emergency calls. Because navigational assistance is a valuable service, a wireless service provider can charge for the service, which helps the wireless service provider pay for the location equipment.

The present invention is particularly well-suited for providing navigation assistance to travelers because it has both a telecommunications capability and a location-finding capability. This means that the present invention can use its location-finding capability to track the movements of a wireless terminal carried by a traveler and its telecommunications capability to transmit information to the traveler based on the location of the wireless terminal (e.g., "You just missed the left turn onto Maple Street needed to reach your Grandmother's house," etc).

The illustrative embodiment of the present invention addresses three common navigation problems and provides various forms of navigational assistance to travelers in solving those problems.

The first navigation problem involves a traveler who takes the same trip infrequently. For example, when a traveler takes a short trip frequently (e.g., drive every day to work, drive once a week to the grocery store, etc.), the frequent repetition of making the trip is likely to ingrain the directions into the traveler's mind such that the traveler has no difficulty in remembering them. In contrast, when a traveler takes a long trip infrequently (e.g., drive once a year from home to Niagara Falls, etc.), the traveler is less likely to remember from past experience how to navigate to make the trip. This is particularly true when the route is convoluted.

Therefore, to aid a traveler who takes the same trip infrequently, the illustrative embodiment tracks the movement of the traveler during one trip, records his or her movements, and, thereafter, provides navigational directions to the traveler (e.g., "turn left ahead at Maple Street," etc.) at a later time on how to make the trip again.

The second navigation problem involves a traveler who needs to navigate homeward after completing the outward-bound portion of a trip. Even when a traveler has successfully navigated the outward-bound portion of a trip, the directions for navigating homeward are not necessarily obvious. This is particularly true when the outward-bound portion of the trip is particularly circuitous or involves backtracking. Therefore, to aid a traveler in making the homeward portion of a trip, the illustrative embodiment tracks the movement of the traveler on the outward-bound portion of the trip, records his or her movements, and, thereafter, provides navigational directions to the traveler on how to get home.

The third navigation problem involves multiple travelers who desire to take the same trip to the same destination in separate vehicles (e.g., the members of a caravan or convoy, etc.). When two or more travelers desire to take the same trip, all of the travelers must agree in advance:

1) to follow a predetermined route,
2) to remain in visual contact and play follow-the-leader, or
3) to maintain an open telecommunications channel so that they can coordinate their movement on an ad hoc basis.

In some cases, these may not be feasible. For example, it is not possible for a group of travelers to follow a predetermined route when the ultimate destination is not known in advance. Furthermore, if the travelers desire to travel at different times or don't know each other, it is not feasible for them to maintain visual contact or ongoing communications. Therefore, to aid a traveler in recreating the trip taken by another traveler, the illustrative embodiment tracks the movement of one traveler when taking a trip, records his or her movements, and, thereafter, provides navigational assistance to other travelers on how to recreate the trip taken by the first traveler.

The illustrative embodiment of the present invention addresses all three problems by using both its telecommunications capability and its location-finding capability.

In general, the illustrative embodiment performs two fundamentally distinct steps. In accordance with the first step, the illustrative embodiment tracks and records the movement of a wireless terminal associated with a traveler as he or she makes a trip. In accordance with the second step, the illustrative embodiment generates a set of navigational directions based on a previously recorded trip, which directions indicate either how to recreate the trip or how to backtrack the trip. The navigational directions are then transmitted, via the telecommunications capability of the illustrative embodiment, to a wireless terminal associated with the traveler who desires them.

BRIEF DESCRIPTION OF THE DRAWINGS

FIG. 4 depicts a flowchart of the operation of an illustrative embodiment of the present invention.

FIG. 5 depicts a flowchart of the salient steps involved in the first step of the flowchart in FIG. 4.

FIG. 7 depicts a flowchart of the salient steps involved in the second step of the flowchart in FIG. 4.

DETAILED DESCRIPTION

Figure 1:
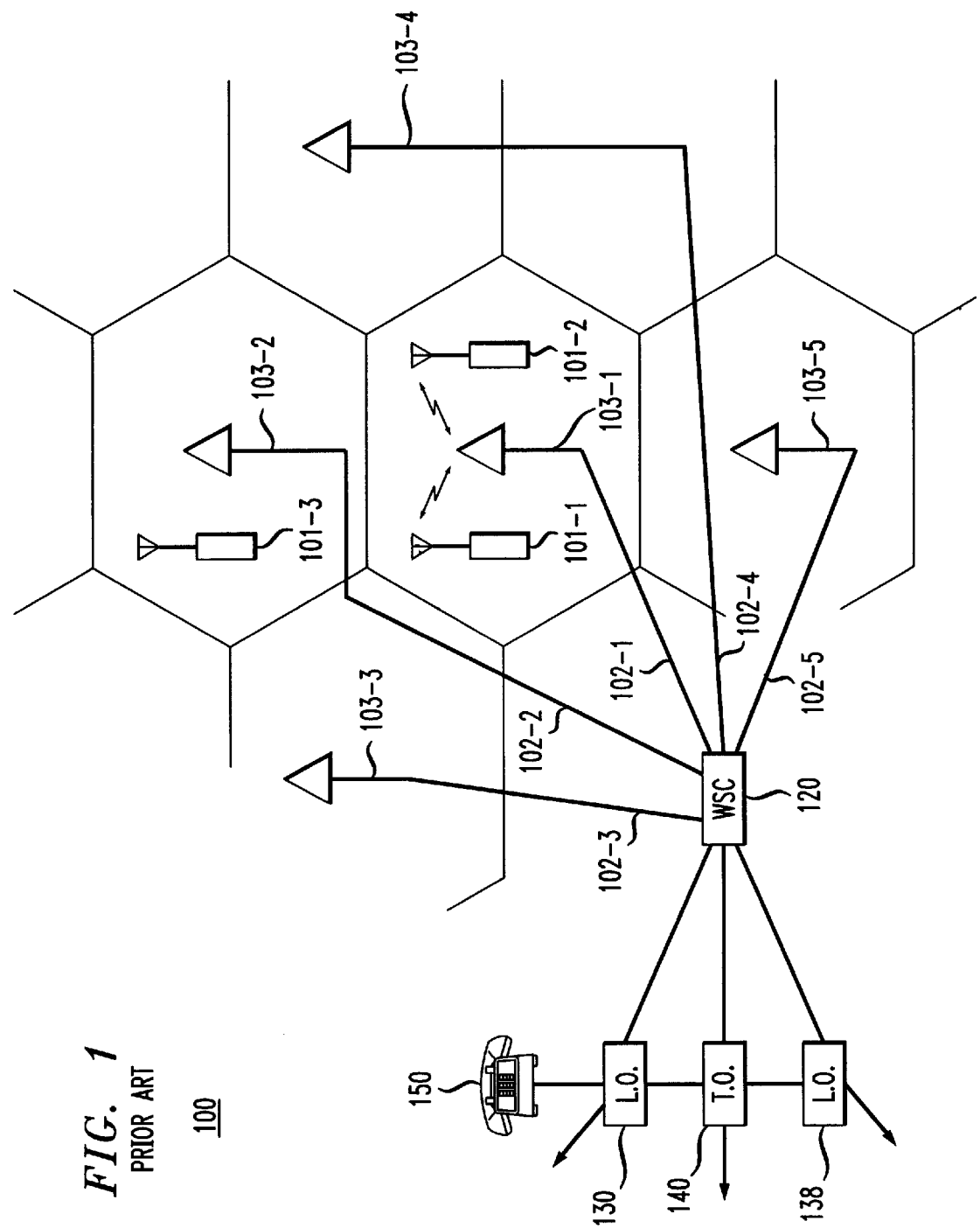
FIG. 1 depicts a schematic diagram of a wireless telecommunications system in the prior art.
Figure 2:
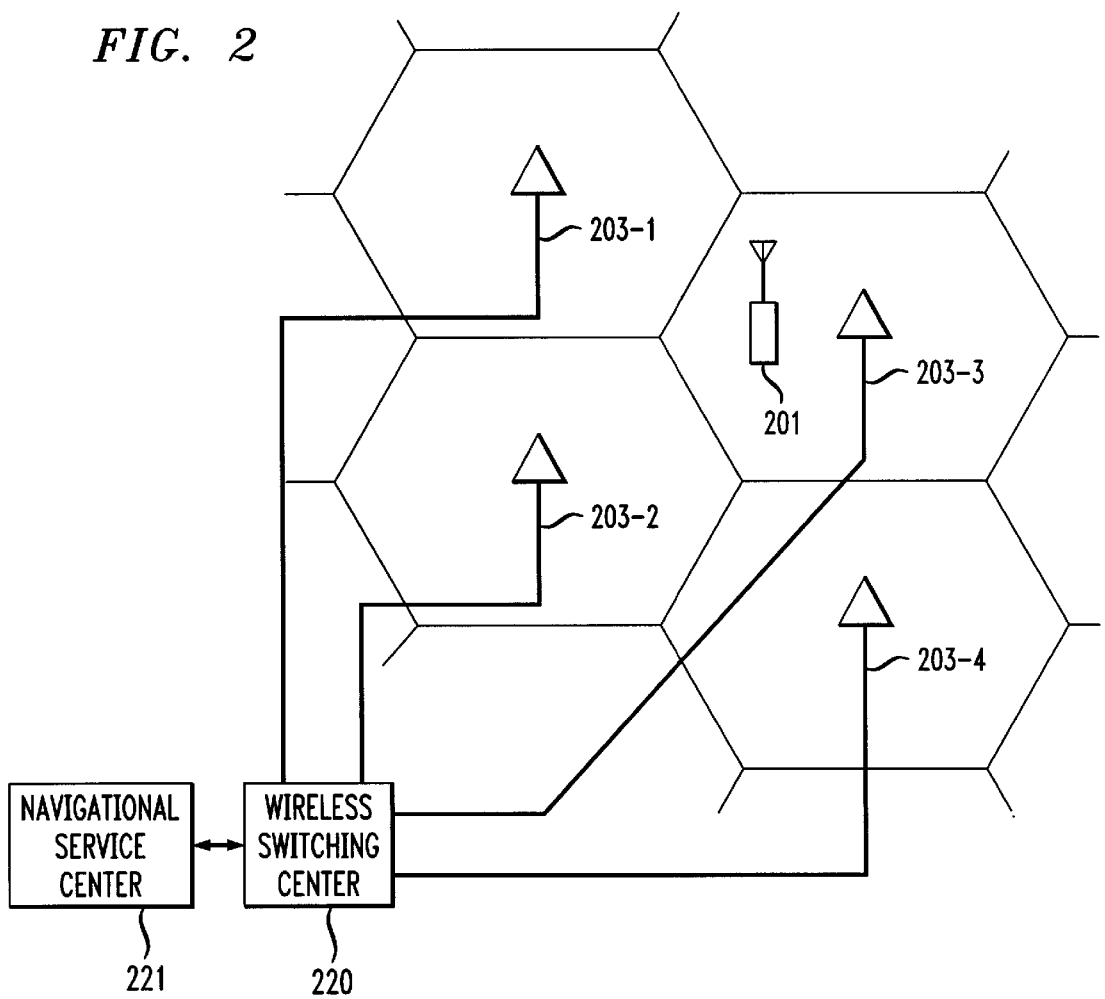
FIG. 2 depicts a schematic diagram of the illustrative embodiment of the present invention.

FIG. 2 depicts a schematic diagram of the illustrative embodiment of the present invention, which comprises: wireless switching center 220, base stations 203-1 through 203-4, and navigational service center 221. The illustrative embodiment is capable of:

1) providing wireless telecommunications service, including emergency service, to wireless terminal 201,
2) recording the movement of wireless terminal 201 as it makes a trip, and
3) providing navigational assistance to wireless terminal 201 or another wireless terminal based on a prior trip by wireless terminal 201.

It will be clear to those skilled in the art how to make and use wireless switching center 220 and base stations 203-1 through 203-4, in accordance with the present invention.

Figure 3:
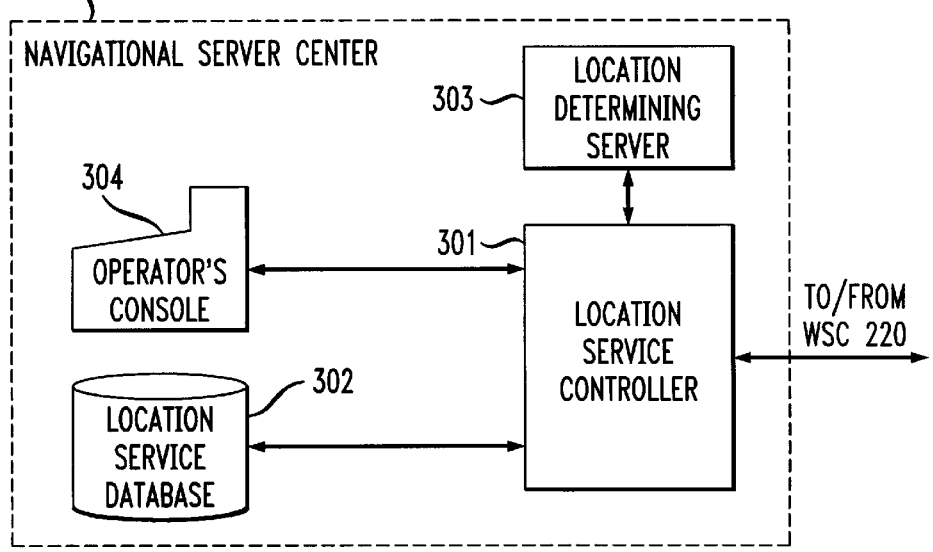
FIG. 3 depicts a block diagram of the salient components of navigational service center 221 in FIG. 2.

Navigational service center 221 is responsible for providing all facets of both emergency service and navigational assistance to wireless terminal 201. FIG. 3 depicts a block diagram of the salient components of navigational service center 221, which comprises: location service controller 301, location service database 302, location determining server 303, and operator's console 304. Location service controller 301is advantageously a general purpose computer that is programmed to orchestrate both emergency service and navigational assistance and to control the operation of the other elements in navigational service center 221.

Location service database 302 advantageously contains, among other things, digitized road maps of the area serviced by the illustrative embodiment, personal preference files for those travelers who use the navigational assistance, and the data for all previously recorded trips.

Location determining server 303 advantageously determines the location of wireless terminal 201 when requested to do so by location service controller 301, and provides location service controller 301 with that information when it is obtained. Operator's console 304 enables a traveler to call navigation service center 221 and to speak to an operator and thus request a service or change a preference in the traveler's personal preference file. Alternatively, it will be clear to those skilled in the art that the operator's console could be replaced by automated processes within location service controller 301

FIG. 4 depicts a flowchart of the operation of the illustrative embodiment of the present invention, which records the movement of a wireless terminal as it travels during a trip and then uses that information at a later time to provide navigational assistance. In doing so, the illustrative embodiment performs two fundamentally distinct steps: (1) the recording of a trip, and (2) the provision of navigational assistance based on the trip.

Recording a Trip

Prior to step 401 in FIG. 4, a traveler with a wireless terminal decides to take a trip. The traveler can have a specific destination in mind (e.g. Grandma's house, Niagara Falls, etc.) or a generic destination (e.g., a secluded lake, a grocery store, etc.) or no destination in mind at all (e.g., a Sunday drive to see the autumn foliage in Vermont, etc.). Furthermore, the traveler can use any means of transportation (e.g., automobile, boat, bicycle, airplane, walking, etc.) or any combination of means.

It will be clear to those skilled in the art that the illustrative embodiment does not literally track the movement of the traveler, but tracks the movement of a wireless terminal that the traveler keeps with him or her during the trip. In this way, the movement of the wireless terminal is treated as a proxy for the movement of the traveler. Therefore, a traveler using an embodiment of the present invention should be advised to keep to his or her wireless terminal close at hand during the entire trip.

Step 401 begins when the traveler is ready to start the trip, and FIG. 5 depicts a flowchart of the salient aspects of step 401.

At step 501, a request is transmitted to navigational service center 221 (in FIG. 2) to begin recording the movement of wireless terminal 201 during the trip on which the traveler is about to embark. The request can be made, for example, by calling a telephone number associated with navigational service center 221 and by speaking to an operator or by pushing the buttons on wireless terminal 201's keypad. Alternatively, the request can be made over the Internet. The traveler can make the request for himself or herself, or another person can make the request for the traveler. Furthermore, the request can be transmitted to navigational service center 221 via wireless terminal 201 or via another wireless terminal or via a wireline terminal. It will be clear to those skilled in the art how to communicate a request to navigational service center 221.

In addition to the request itself, a trip identifier is also transmitted to navigational service center 221. The trip identifier is analogous to a filename in a computer that an enables the traveler, another traveler, or other processes to identify that trip at a later time. For example, the identifier can be a mnemonic that is descriptive and easily remembered (e.g., "Trip to Grandma's house from home," "To Niagara Falls from Santa Fe," etc.) or it can be more cryptic (e.g., "Trip 38A–S," etc.). The salient characteristic of the trip identifier is that it must enable a traveler to unambiguously distinguish that trip from other trips.

At step 506, navigational service center 221 receives both the request to record the trip and the trip identifier. From step 506, control passes to step 507 at which navigational service center 221 begins recording and advantageously transmits an acknowledgement to wireless terminal 201 that recording has begun. From step 507, control passes to step 508.

At step 508, the illustrative embodiment locates wireless terminal 201. Although the illustrative embodiment could locate and record the movement of wireless terminal 201 continuously, such an approach could monopolize the location equipment and interfere with the processing of emergency calls. Therefore, the illustrative embodiment instead locates and records the movement of wireless terminal 201 at intermittent points, called "waypoints," during a trip. For the purpose of this specification, the term "waypoint" is defined as a point in geometric space. When the movement of a wireless terminal is restricted to the surface of the Earth, a waypoint is advantageously recorded in terms of latitude and longitude. If the altitude of a waypoint is, for some reason, deemed advantageous, it too can be recorded.

Because the illustrative embodiment locates and records waypoints for wireless terminal 201 intermittently, there must be a systematic plan for determining when waypoints are chosen for recordation. In general, the systematic plan must balance three factors:

1. The waypoints should be recorded with sufficient frequency so that unambiguous navigational directions can be generated from the waypoints at a later time. For example, enough waypoints should be recorded near an intersection to be capable of determining at a later time how to traverse the intersection.

2. If the waypoints are recorded too frequently, the number of waypoints to be stored and processed will be excessive. For example, if a waypoint is recorded every 2 inches during a 3000 mile cross-country trip, it would generate over 95 million waypoints.

3. Furthermore, if the waypoints are recorded too frequently, the location equipment in the illustrative embodiment could be monopolized, which could prevent the processing of emergency calls or the locating of other wireless terminals.

Therefore, the illustrative embodiment balances these three factors by choosing the frequency with waypoints are recorded based on the following criteria.

1) Fixed-Time Intervals—the illustrative embodiment records a waypoint at least every n seconds (e.g., one waypoint every 15 seconds, etc.). This criterion provides a minimum frequency for the recordation of waypoints.

2) Geographical Factors—the illustrative embodiment also records waypoints more frequently (e.g., one waypoint every 1 second, etc.) when the traveler is near an intersection or on a local street than when the traveler is on an open highway. For example, because location service database 302 (in FIG. 3) contains detailed road maps and knows the location of streets, highways, and intersections, the illustrative embodiment can temporarily increase the frequency of recording waypoints when the traveler is near certain geographical features.

3) Command-Based—the illustrative embodiment also records waypoints more frequently (e.g., one waypoint every 1 second, etc.) when requested to do by the traveler. For example, the traveler may be in the best position to judge when the geography suggests that detailed directions will be helpful at a later time. Therefore, at step 504, the traveler can transmit a request to navigational service center 221, via wireless terminal 201, to increase the frequency of recording waypoints. In general, such a request will be remain in effect for only a fixed duration (e.g., 5 minutes, etc.).

Therefore, the illustrative embodiment records a waypoint when any of the above three criteria indicates that it is appropriate to do so until a request is received (step 505) to cease recording. In other words, the illustrative embodiment iterates between steps 507, 508, 509, and 510 until a request is received at step 510 to cease recording.

When the illustrative embodiment determines that it is appropriate to record a waypoint, it must (at step 508) locate wireless terminal 201 so that it has the data needed to record the waypoint.

It will be clear to those skilled in the art that there are various ways in which the illustrative embodiment can ascertain the location of wireless terminal 201. For example, wireless terminal 201 can comprise a satellite position system receiver (e.g., a Global Positioning System receiver, etc.) so that wireless terminal 201 can determine its own latitude and longitude. In such case, wireless terminal 201 provides its location to navigational service center 221 when requested, as shown in step 503. An example of such an arrangement is taught by G. J. Grimes, U.S. Pat. No. 5,479,482, entitled "Cellular Terminal For Providing Public Emergency Call Location Information," issued Dec. 26, 1995, which is incorporated by reference. In accordance with another technique, wireless terminal 201 and location determining server 303 share the task of computing the latitude and longitude of wireless terminal 201. In such case, wireless terminal 201 provides an indicium of its location to navigational service center 221 when requested, also at step 503. An example of such an arrangement is taught by G. Vannucci and R. E. Richton in U.S. patent applications Ser. Nos. 08/927,432, and 08/927,434, both of which are pending and both of which are incorporated by reference.

In accordance with other techniques, either wireless terminal 201 or base stations 203-1 through 203-4 use terrestrial triangulation techniques, in well-known fashion, to determine the location of wireless terminal 201 based on the time-of-arrival or direction-of-arrival of signals transmitted from the other. It will be clear to those skilled in the art how to determine the location of wireless terminal 201 for the purposes of the present invention.

At step 509, navigational service center 221 records the most recently ascertained waypoint into location service database 302 in a data structure such as that shown in Table 1, which has the identifier "From Home to Grandma's House."

TABLE 1

From Home to Grandma's House

| Waypoint | Latitude | Longitude |
|---|---|---|
| 603-1 | 40° 36' 00" N | 72° 47' 30" W |
| 603-2 | 40° 36' 00" N | 72° 47' 20" W |
| 603-3 | 40° 36' 20" N | 72° 47' 00" W |
| 603-4 | 40° 36' 40" N | 72° 47' 00" W |
| 603-5 | 40° 37' 20" N | 72° 47' 00" W |
| 603-6 | 40° 37' 40" N | 72° 47' 00" W |
| 603-7 | 40° 38' 00" N | 72° 46' 40" W |
| 603-8 | 40° 38' 00" N | 72° 46' 20" W |
| 603-9 | 40° 38' 30" N | 72° 46' 00" W |

Figure 6:
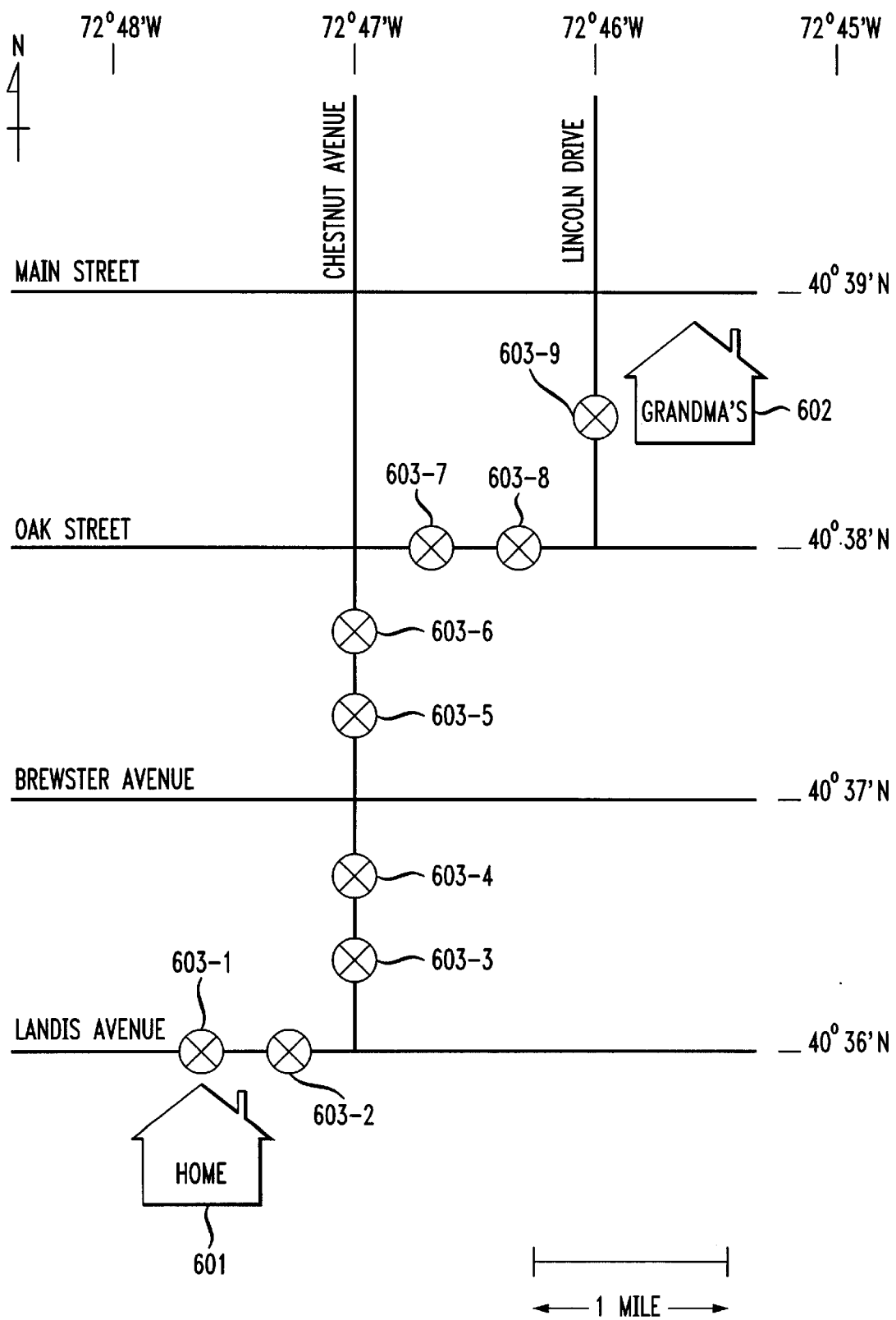
FIG. 6 depicts a map of an illustrative geographic region that is serviced by the illustrative embodiment.

FIG. 6 depicts an example of a map of a geographic region that can be serviced by the illustrative embodiment. The map depicts Home 601, Grandma's House 602, several streets and the nine waypoints, 603-1 through 603-9, in Table 1 that were recorded as a traveler made a trip from Home 601 to Grandma's House 602.

At the end of the trip, which is step 505, a request is transmitted to navigational service center 221 (in FIG. 2) to cease recording the movement of wireless terminal 201. Like the request to begin recording, the request to cease recording can be made, for example, by calling a telephone number associated with navigational service center 221 and by speaking to an operator or by pushing the buttons on wireless terminal 201's keypad. Alternatively, the request can be made over the Internet. Analogously, the traveler can make the request himself or another person can make the request for the traveler. Furthermore, the request can be transmitted to navigational service center 221 via wireless terminal 201 or via another wireless terminal or via a wireline terminal. It will be clear to those skilled in the art how to communicate a request cease recording to navigational service center 221.

At this point, the step of recording a trip is complete and the result is a table of waypoints as shown in Table 1 and stored in location services database 302. After the step of recording is complete, the step of providing navigational assistance, step 402, begins.

Providing Navigational Assistance

Prior to step 402, but after step 401, a traveler with a wireless terminal decides to take a trip and decides to have the illustrative embodiment provide navigational assistance for that trip, which navigational assistance is based on a previously recorded trip. This traveler can be same as that in step 401, or another traveler. The traveler can use any means of transportation (e.g., automobile, boat, bicycle, airplane, walking, etc.) or any combination of means, and need not use the same means as were used for the previously recorded trip. When the traveler wants the navigational assistance to begin, the illustrative embodiment begins performing step 402. FIG. 7 depicts a flowchart of the salient aspects of step 402.

At step 701, a request is transmitted to navigational service center 221 (in FIG. 2) to provide navigational assistance. As with the request in step 501, the request in step 701 can be made, for example, by calling a telephone number associated with navigational service center 221 and by speaking to an operator or by pushing the buttons on wireless terminal 201's keypad. Alternatively, the request can be made over the Internet. The traveler can make the request himself or another person can make the request for the traveler. Furthermore, the request can be transmitted to navigational service center 221 via wireless terminal 201 or via another wireless terminal or via a wireline terminal. It will be clear to those skilled in the art how to communicate the request to navigational service center 221.

In addition to the request itself, five other pieces of information are advantageously transmitted to navigational service center 221 or are located in the traveler's personal preference file in location services database 302. The traveler's personal preference file can be associated with the traveler by, for example, intelligent agent software that is operating within location service controller 301 and that knows the traveler's preferences in obtaining certain services. The other five piece of information are:

1) the trip identifier—The trip identifier identifies the trip for which the traveler is requesting navigational assistance (e.g. "Trip to Grandma's house from home," "To Niagara Falls from Santa Fe," etc.);

2) the playback mode—the playback mode indicates whether the traveler desires to recreate the identified trip or to backtrack the identified trip.

3) the playback style—the playback style indicates whether the traveler prefers the navigational assistance in the form of:

magnetic directions (e.g., turn north onto Main Street and go for 2 miles ), relative directions (e.g., turn left onto Main Street and go for 2 miles ), or landmark directions (e.g., turn left at the gas station and go for 2 miles ), etc.

4) the playback format—the playback format indicates whether the traveler prefers the navigational assistance in the form of:

spoken directions (i.e. speech synthesis), data for a visual display in the form of text or maps, or data for an onboard autonomous navigation system, etc.

5) the delivery mechanism—the delivery system enables the traveler to have all of the information downloaded at once, or to have the illustrative embodiment monitor the traveler's progress on the trip and to provide directions in real time as needed. When the navigational assistance is provided in real time, the illustrative embodiment can notify the traveler if he or she inadvertently deviates from the directions.

At step 702, navigational service center 221 receives the request for navigational assistance and any ancillary information. From step 702, control proceeds to step 703 at which the requested navigational directions are generated in accordance with the preferred playback mode, style and format.

For example, if a traveler requests assistance in recreating the trip "From Home to Grandma's House," whose recorded waypoints are listed in Table 1, with relative directions for a visual display, the illustrative embodiment might produce the directions:

1. Go east on Landis Avenue for ½ mile to Chestnut Avenue;
2. Turn left onto Chestnut Avenue;
3. Go north on Chestnut Avenue for 2 miles to Oak Street;
4. Turn right onto Oak Street;
5. Go east on Oak Street for 1 mile to Lincoln Drive;
6. Turn left onto Lincoln Drive; and
7. Go north on Lincoln Drive for ½ mile to your destination.

Alternatively, if the traveler requests assistance for backtracking the trip "From Home to Grandma's House," with magnetic directions, the illustrative embodiment might produce:

1. Go south on Lincoln Drive for ½ mile to Oak Street;
2. Turn west onto Oak Street;
3. Go west on Oak Street for 1 mile to Chestnut Avenue;
4. Turn south onto Chestnut Avenue
5. Go south on Chestnut Avenue for 2 miles to Landis Avenue;
6. Turn west onto Landis Avenue; and
7. Go west on Landis Avenue for ½ mile to your destination.

It will be clear to those skilled in the art how to turn a succession of waypoints, such as those listed in Table 1, into a series of directions, such as those described above, for either recreating a trip or for backtracking a trip.

At step 704, navigational service center 221 determines if the traveler desires all of the navigation directions to be transmitted at once in a batch. If the traveler does, then control passes to step 705; otherwise control passes to step 707.

At step 705, navigational service center 221 transmits all of the directions to a wireless terminal associated with the traveler. At step 706, the traveler outputs all of the directions on an appropriate output device (e.g., visual display, speaker, etc.) depending on the format of the directions. Alternatively, if the vehicle associated with the traveler has an autonomous navigation system, like those that are beginning to appear on some cars, then the directions can be downloaded directly into the navigation system via the wireless terminal.

At step 707, navigational service center 221 begins the process of providing the directions, in real time, to the wireless terminal. At step 708, the traveler requests that he or she be given the next step in the directions and at step 707, navigational service center 221 provides the next direction. It should be made clear that the traveler will be given the same direction each time a request is made, until navigational service center 221 determines that the direction has been completed. This is advantageous because it allows the traveler to refresh his or her memory with the next direction as many times as he or she desires until the direction is completed. It will be clear to those skilled in the art that the traveler can make the request by, for example, calling navigational service center 221 and speaking to an operator or, alternatively, by pushing a key on the wireless terminal's keypad.

At step 709, navigational service center 221 locates the wireless terminal, in well-known fashion, for the purpose of determining whether the wireless terminal has completed the trip or has deviated from the directions.

At step 710, navigational service center 221 determines if the wireless terminal has reached its destination. If it has, then the illustrative embodiment stops; otherwise, control passes to step 711.

At step 711, navigational service center 221 determines if the wireless terminal has deviated from the route on which it is being directed. If the wireless terminal has deviated from the route, which suggests that it might have missed a turn or otherwise become lost, then control passes to step 712 and navigational service center 221 transmits a warning message to the wireless terminal. Otherwise, control returns to step 707.

At step 713, the wireless terminal receives the warning message, which alerts the traveler to the possibility that he or she is lost and should take remedial action.

It is to be understood that the above-described embodiments are merely illustrative of the invention and that many variations may be devised by those skilled in the art without departing from the scope of the invention. It is therefore intended that such variations be included within the scope of the following claims and their equivalents.

What is claimed is:

1. A method comprising:
   receiving a request to record a plurality of waypoints for a first wireless terminal as said first wireless terminal moves during a trip;
   locating said plurality of waypoints for said first wireless terminal;
   recording said plurality of waypoints;
   receiving a request to cease recording said plurality of waypoints; and
   providing wireless bidirectional, voice, telecommunications service to said first wireless terminal.

2. The method of claim 1 wherein said request to record is received from said first wireless terminal.

3. The method of claim 1 wherein said request to record is accompanied by an identifier for said trip.

4. The method of claim 1 further comprising receiving a request from said first wireless terminal to increase the frequency with which said plurality of waypoints are being recorded.

5. The method of claim 1 further comprising receiving a request to generate a set of directions to recreate said trip based on said plurality of waypoints.

6. The method of claim 5 further comprising transmitting said set of directions to said wireless terminal.

7. The method of claim 5 further comprising transmitting said set of directions to a second wireless terminal.

8. The method of claim 5 further comprising:
   locating said first wireless terminal; and
   transmitting a warning messages to said first wireless terminal when said wireless terminal deviates from said set of directions.

9. The method of claim 1 further comprising receiving a request to generate a set of directions to backtrack said trip based on said plurality of waypoints.

10. The method of claim 8 further comprising transmitting said set of directions to said wireless terminal.

11. The method of claim 8 further comprising transmitting said set of directions to a second wireless terminal.

12. A method comprising:
   recording a plurality of waypoints for a first wireless terminal as said first wireless terminal moves during a trip;

generating a set of directions to recreate said trip based on said plurality of directions; and transmitting said set of directions to said first wireless terminal; and providing bidirectional, voice, wireless telecommunications service to said first wireless terminal.

13. The method of claim 12 further comprising transmitting said set of directions to a second wireless terminal.

14. The method of claim 12 further comprising:

tracking said first wireless terminal; and transmitting a warning messages to said first wireless terminal when said wireless terminal deviates from said set of directions.

15. The method of claim 12 wherein said set of directions are oral.

16. An apparatus comprising:

a location service controller for receiving a request to record a plurality of waypoints for a first wireless terminal as said first wireless terminal moves during a trip, and for receiving a request to cease recording said plurality of waypoints;

a location determining server for locating said plurality of waypoints for said first wireless terminal;

a location service database for recording said plurality of waypoints; and a wireless switching center through which said location determining server locates said plurality of waypoints for said first wireless terminal.

17. The apparatus of claim 16 wherein said request to record is received from said first wireless terminal.

18. The apparatus of claim 16 wherein said request to record is accompanied by an identifier for said trip.

19. The apparatus of claim 16 further comprising a base station for transmitting said set of directions to said wireless terminal.

20. The apparatus of claim 16 further comprising a base station for receiving a request to increase the frequency with which waypoints are recorded.

21. An apparatus comprising:

a location service database for recording a plurality of waypoints for a first wireless terminal as said first wireless terminal moves during a trip;

a location service controller for generating a set of directions to recreate said trip based on said plurality of directions; and a base station for wirelessly transmitting said set of directions to said first wireless terminal and for providing bidirectional, voice, wireless telecommunications service to said first wireless terminal.

22. The apparatus of claim 21 further comprising a location determining server for tracking said first wireless terminal.

23. The apparatus of claim 21 wherein said base station transmits a warning message to said first wireless terminal when said wireless terminal deviates from said set of directions.

24. A method comprising:

generating a set of directions for a trip based on a plurality of waypoints;

transmitting said set of directions to a first wireless terminal;

locating said first wireless terminal while said first wireless terminal travels on said trip; and transmitting a warning message to said first wireless terminal when said wireless terminal deviates from said set of directions.

25. An apparatus comprising:

a location service database for recording a plurality of waypoints for a first wireless terminal as said first wireless terminal moves during a trip;

a location service controller for generating a set of directions to recreate said trip based on said plurality of directions; and a base station for transmitting said set of directions to said first wireless terminal;

wherein said base station transmits a warning message to said first wireless terminal when said wireless terminal deviates from said set of directions.

26. A method comprising:

providing bidirectional, voice, wireless telecommunications service to a wireless terminal;

recording the movement of said wireless terminal as it makes a trip; and providing navigational assistance to said wireless terminal based on said trip.

\* \* \* \* \*